(12) United States Patent
Iriyama

(10) Patent No.: US 8,325,573 B2
(45) Date of Patent: Dec. 4, 2012

(54) OPTICAL RECORDING DEVICE AND RECORDING METHOD

(75) Inventor: Toshihisa Iriyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/173,003

(22) Filed: Jun. 30, 2011

(65) Prior Publication Data

US 2012/0008487 A1 Jan. 12, 2012

(30) Foreign Application Priority Data

Jul. 9, 2010 (JP) ............................... P2010-156399

(51) Int. Cl.
*G11B 7/00* (2006.01)

(52) U.S. Cl. .................. 369/47.16; 369/47.28; 369/47.3

(58) Field of Classification Search ............... 369/47.12, 369/47.15, 47.16, 47.19, 47.2, 47.23, 47.24, 369/47.28, 47.29, 47.3

See application file for complete search history.

(56) References Cited

U.S. PATENT DOCUMENTS

| | | | | |
|---|---|---|---|---|
| 5,218,689 A | * | 6/1993 | Hotle | 711/114 |
| 5,974,015 A | * | 10/1999 | Iizuka et al. | 386/201 |
| 5,986,835 A | * | 11/1999 | Tanaka et al. | 360/53 |
| 6,137,763 A | * | 10/2000 | Dahan et al. | 369/95 |
| 7,075,870 B2 | | 7/2006 | Akiyama et al. | |

FOREIGN PATENT DOCUMENTS

JP 2000-187879 A 7/2000

* cited by examiner

*Primary Examiner* — Nabil Hindi
(74) *Attorney, Agent, or Firm* — Lerner, David, Littenberg, Krumholz & Mentlik, LLP

(57) ABSTRACT

A recording device includes a plurality of channels configured to record data to an optical recording medium, a reception unit configured to receive data transmitted from an external device, a storage unit configured to temporarily store the data that is received by the reception unit, and a distribution control unit configured to read the data that is stored in the storage unit and distribute the data by a block unit to the plurality of channels based on transfer time of the data and recording time to the optical recording medium so that record processing of the plurality of channels are simultaneously ended.

6 Claims, 5 Drawing Sheets

OPTICAL RECORDING DEVICE AND RECORDING METHOD

CROSS-REFERENCE TO RELATED APPLICATION

The present application claims priority from Japanese Patent Application No. JP 2010-156399 filed in the Japanese Patent Office on Jul. 9, 2010, the entire content of which is incorporated herein by reference.

BACKGROUND

The present technology relates to a recording device which is an optical recording device recording with respect to an optical recording medium and especially having two or more recording channels and a recording method. The recording device and the recording method efficiently distribute and record data with respect to each of the channels.

Japanese Unexamined Patent Application Publication No. 2000-187879 discloses a technology that includes a plurality of recording heads and efficiently distributes data to the heads so as to be able to record the data of a plurality of recording layers of an optical recording medium, though not aiming to high-speed data recording, and can record the data in high speed.

In recent years, optical recording media (also referred to below as an optical disc) such as a compact disc (CD), a digital versatile disc (DVD), and Blu-ray® disc (BD) to which information recording is performed by irradiation of a light beam have been widespread and optical recording devices (optical disc drive devices) have been widespread with the spread of the optical recording media.

In terms of an optical recording device, there is a method for speeding up data-recording with respect to the optical recording medium by rotating an optical recording media in high speed. However, further speeding up is difficult due to a limit of recording speed caused by a property of an optical recording medium, a limit of processing capability of a signal processing LSI, and a physical limit of high-speed rotation of the optical recording medium.

Accordingly, high multiple speed recording is realized by using a plurality of recording channels.

Here, in this specification, even though one recording head is provided, there is a case where a plurality of laser light beam irradiation systems are mounted on the recording head. Therefore, a plurality of laser light beam irradiation systems is called a plurality of channels and one laser light beam irradiation system is called one channel.

That is, a "channel" is one recording system which can independently perform recording by laser light beam irradiation.

SUMMARY

However, in a case where contiguous data is recorded by a plurality of heads (or channels), when the contiguous data is received by a predetermined interface and is allocated equally to each of the channels, processing efficiency is not enhanced as much as expected due to a relationship among data transfer time of respective channels.

It is desirable to provide an optical recording device that further enhances recording speed when a plurality of recording heads are used.

An optical recording device according to an embodiment of the present technology includes a plurality of channels configured to record data to an optical recording medium, a reception unit configured to receive data transmitted from an external device, a storage unit configured to temporarily store the data that is received by the reception unit, and a distribution control unit configured to read the data that is stored in the storage unit and distribute the data by a block unit to the plurality of channels based on transfer time to the channels and recording time to the optical recording medium so that record processing of the plurality of channels are simultaneously ended.

The distribution control unit includes a data block counting unit configured to count the number of blocks of the data, a calculation unit configured to calculate the number of blocks that are to be distributed to each of the plurality of channels so that among the number of blocks of the data, which is counted by the counting unit, a predetermined number of blocks that are transmitted to a first channel of the plurality of channels are transferred, then a predetermined number of blocks that are transmitted to a next channel are transferred, and after this transfer, transfer is performed to another next channel so as to transfer a predetermined number of blocks to all of the channels, a sum of the numbers of blocks that are transferred to each of the channels is same as the number of blocks, which is counted by the counting unit, and end time of the transfer time and the recording time of the predetermined number of the blocks that are transmitted to the first channel of the plurality of channels is same as end time of the transfer time and the recording time with respect to each of the channels other than the first channel, and a distribution unit configured to distribute a predetermined number of blocks to each of the plurality of channels among the blocks of which the number is counted by the counting unit, based on the calculation unit.

Accordingly, the plurality of channels can be operated in parallel so as to be effectively used.

The calculation unit calculates the number of blocks that are to be transmitted to an a-th channel that is a second or later channel by $(1-x/y)(a-1) \times i$ by using transfer time x to the channel per block, recording time y per block, and the number i of blocks that are to be transferred to the first channel of the plurality of channels, with respect to the number n of blocks of the data, which is counted by the counting unit, and thus calculates the number of blocks that are to be transmitted to each of the plurality of channels so that the number of all blocks becomes n.

According to this calculation, all end time points of recording time in which the data is respectively recorded to the plurality of channels become same as each other.

The distribution control unit includes a distribution table that shows the number, which is calculated in the calculation unit, of blocks that are to be distributed to the plurality of channels as a table in a manner that the number of blocks corresponds to a value of the number n of the blocks.

A recording method, according to another embodiment of the present technology, for recording data to an optical recording medium in a recording device having a plurality of channels includes counting the number of blocks of the data, and distributing and recording to each of the plurality of channels so that among the counted number of blocks of data, a predetermined number of blocks that are transmitted to a first channel of the plurality of channels is transferred, then a predetermined number of blocks that are transmitted to a next channel are transferred, and after this transfer, transfer is performed to another next channel so as to transfer a predetermined number of blocks to all of the channels, a sum of the numbers of blocks that are transferred to each of the channels is same as the counted number of blocks, and end time of the transfer time and the recording time of the predetermined number of the blocks that are transmitted to the first channel of the plurality of channels is same as end time of the transfer time and the recording time with respect to each of the channels other than the first channel.

A recording method, according to still another embodiment of the present technology, for recording data to an optical recording medium in a recording device having a plurality of channels includes counting the number of blocks of the data, and calculating the number of blocks that are to be transferred to an a-th channel that is a second or later channel by $(1-x/y)(a-1) \times i$ by using transfer time x to the channel per block, recording time y per block, and the number i of blocks that are to be transmitted to a first channel of the plurality of channels, with respect to the counted number n of blocks of the data so as to distribute and record the number of blocks to each of the channels.

According to the embodiments of the present technology, data can be distributed to the optical recording medium which is loaded on the optical recording device having the plurality of channels so as to effectively use the plurality of channels.

Here, the "channel" indicates one recording system that can independently perform recording by laser light beam irradiation. For example, in a case where a plurality of recording heads are provided to a recording device, a plurality of channels are surely provided. Further, even a single recording head may be a recording head on which two or more laser output systems are mounted. In this case, even though this is a unit as one recording head physically, a plurality of "channels" are provided.

According to the embodiments of the present technology, data is appropriately allocated to each of the channels, operational efficiency of the channels is optimized, and a high-speed optical recording device having a plurality of channels can be realized.

DETAILED DESCRIPTION OF EMBODIMENTS

An embodiment and another embodiment of the present technology are described below in sequence.

Embodiment

Figure 1:
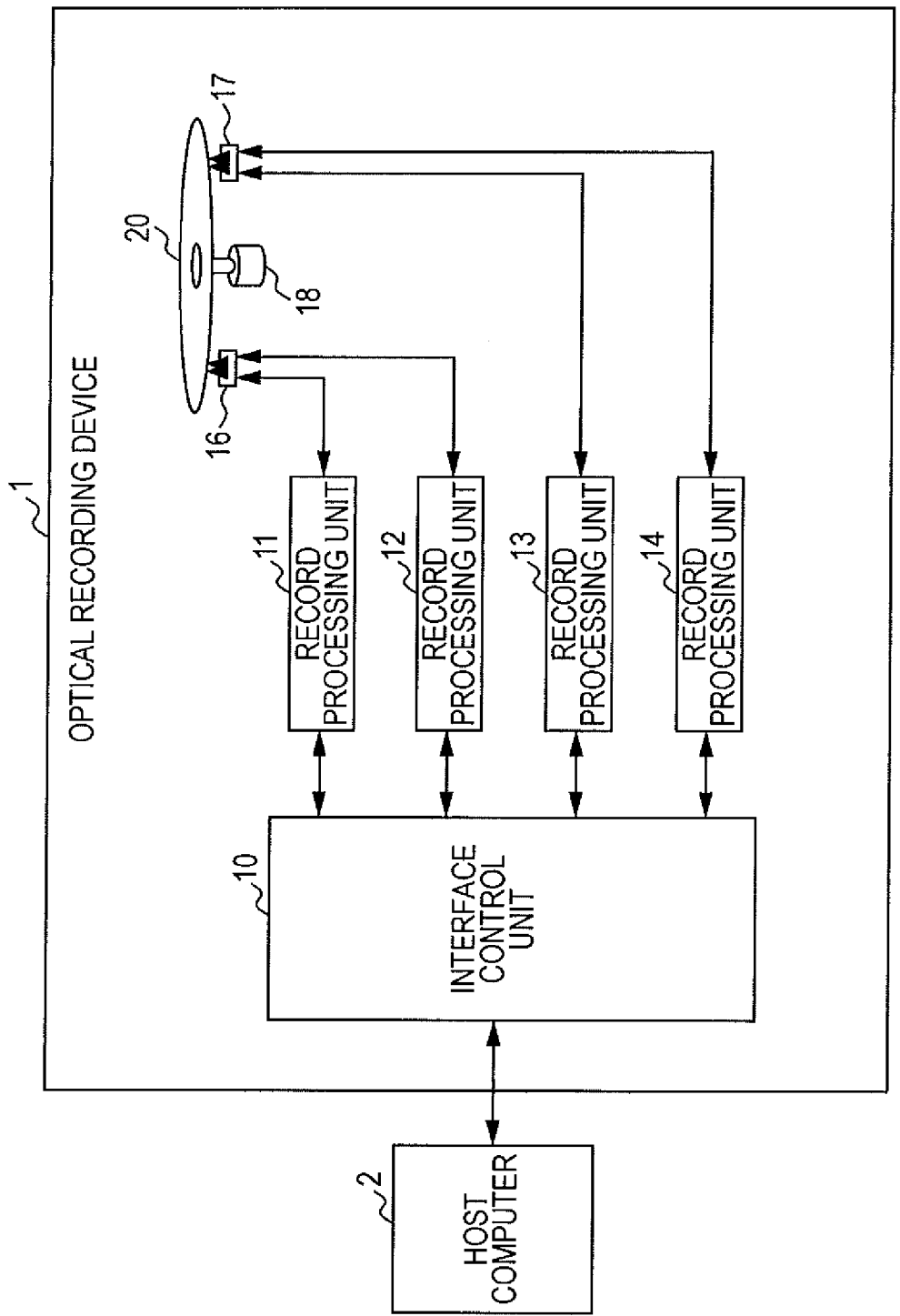
FIG. 1 illustrates a specific example of an optical recording device of a two-head-four-channel type.

FIG. 1 illustrates a specific example of an optical recording device, which includes a plurality of heads, according to an embodiment of the present technology. In reference to FIG. 1, an outline of an operation in which data is recorded in an optical recording medium is described.

Referring to FIG. 1, an optical recording medium 20 is an optical recording medium such as a compact disc (CD), a digital versatile disc (DVD), and a Blu-ray® disc (BD) to which a signal is recorded by light beam irradiation.

FIG. 1 illustrates an optical recording device 1 which uses optical heads 16 and 17 (referred to below as heads) of a one-head-two-channel type. Here, the "one-head-two-channel" type indicates that two laser light beam irradiation systems are mounted on one head.

Here, there is also a case where a plurality of heads on each of which one laser light beam irradiation system is mounted are used. Further, there is a case where a plurality of laser light beam irradiation systems are provided on one head, as well. Accordingly, as long as a plurality of laser light beam irradiation systems (plurality of channels) are provided, all of these cases are within the scope of the present technology.

This optical recording device 1 receives data transmitted from an external host computer 2 and records the data in the optical recording medium 20.

The optical recording medium 20 is loaded on the optical recording device 1 and is set on a turn table, which is not shown in the drawing, so as to be rotary-driven by a spindle motor 18 shown in FIG. 1.

As a mechanism for radiating a laser light beam for recording with respect to the optical recording medium 20 which is rotary-driven, the heads 16 and 17 are provided.

In a case shown in FIG. 1, one head having two channels is disposed on one side of the optical recording medium 20 and the other head having two channels is disposed another side of the optical recording medium 20 so as to be opposed to each other by 180 degrees. Thus, recording can be performed to the optical recording medium 20 by four channels simultaneously.

A record processing unit 11, a record processing unit 12, a record processing unit 13, and a record processing unit 14 are respectively disposed on the channels, and data transmitted to each of the channels is recorded in the optical recording medium by controlling an optical system in each of the heads.

Each of the record processing units 11 to 14 performs error correction code adding (ECC encode), interleaving, sub code adding, and the like. Further, with respect to the data which has undergone these processing, each of the record processing units 11 to 14 performs run length limited code modulation. Further, each of the record processing units 11 to 14 generates a laser driving pulse based on the recording data which has undergone the modulation processing so as to drive a laser diode in the inside of the optical heads. When the laser diode emits a laser light beam based on the laser driving pulse, a mark corresponding to the data is formed in the optical recording medium 20. That is, the data is recorded.

An interface control unit 10 receives data transmitted from the host computer 2 and performs a control for distributing the data to the respective channels so that recording with respect to the optical recording medium can be efficiently performed by the record processing units 11 to 14 of the respective channels.

Figure 2:
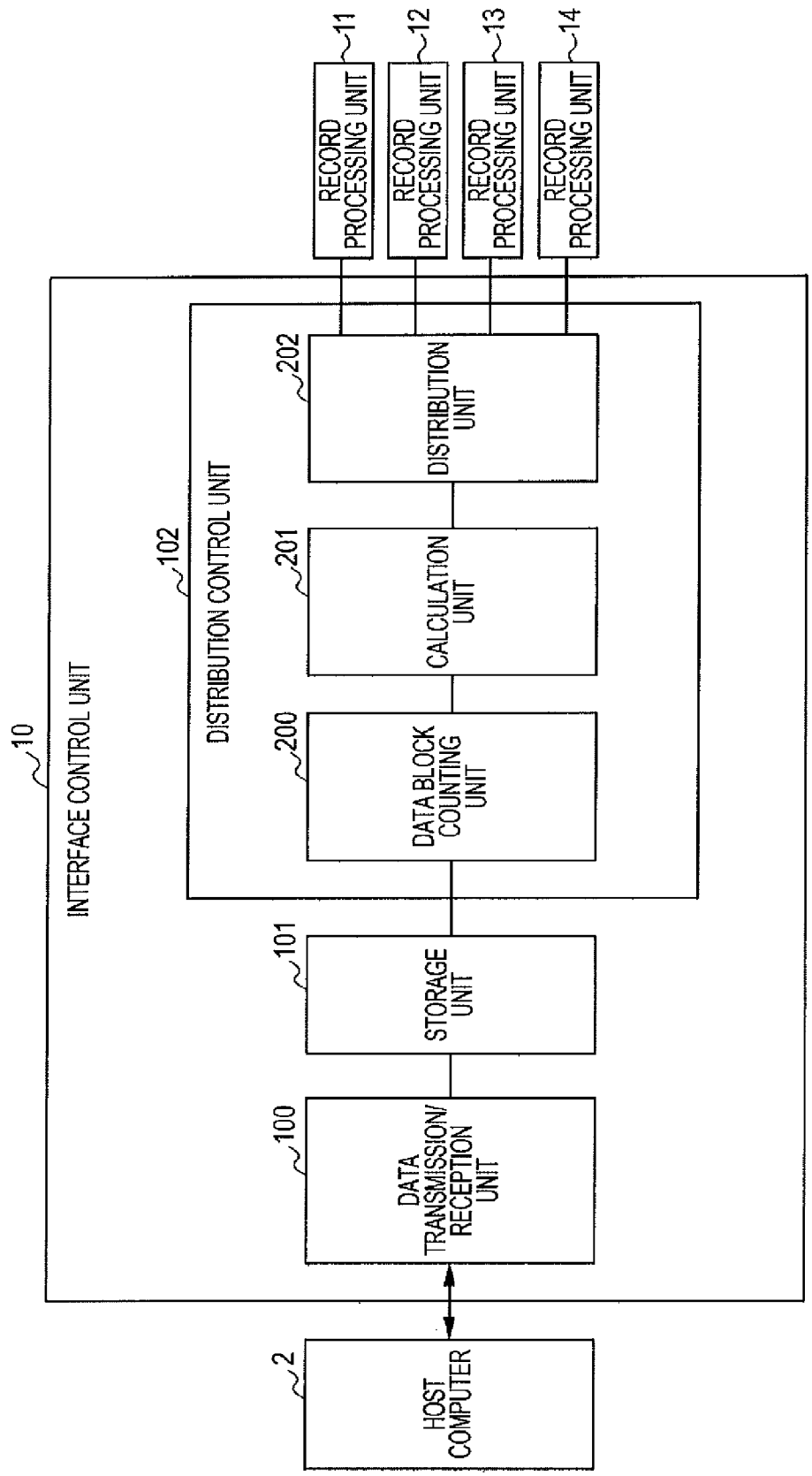
FIG. 2 illustrates an embodiment of the present technology.

FIG. 2 illustrates the detailed configuration of the interface control unit 10 according to the embodiment. The interface control unit 10 includes a data transmission/reception unit 100, a storage unit 101, and a distribution control unit 102.

The data transmission/reception unit 100 receives data transmitted from the host computer 2 by a predetermined interface. This interface is a serial advanced technology attachment (SATA) interface, for example.

The received data is temporarily stored in the storage unit 101.

The host computer commonly requests the optical recording device 1 for a recording operation by a write command (writing request) having a predetermined data form. For example, in a writing request, the host computer notifies information of an address which is to be written on the optical recording medium 20 and information of a data amount and subsequently transmits actual recording data.

Thus, the optical recording device 1 receives the data transmitted in such way by the data transmission/reception unit 100 and buffers the data in the storage unit 101.

The distribution control unit 102 performs control of distributing the data which is temporarily stored in the storage unit 101 to the record processing unit 11, the record processing unit 12, the record processing unit 13, and the record processing unit 14 that respectively correspond to the channels.

Here, the optical recording device 1 includes four channels as the recording system, but the host computer 2 serially transfers recording data by one interface in sequence when making the writing request. The distribution control unit 102 performs processing for distributing each block of the recording data which is sequentially transmitted as above to each of the channels.

The distribution control unit 102 includes a data block counting unit 200, a calculation unit 201, and a distribution unit 202.

The data block counting unit 200 counts the number of blocks of the data which is stored in the storage unit 101.

In this embodiment, one block is assumed to be a data unit of 64 kilobytes.

The host computer 2 transmits recording data (video data, audio data, or the like) of 200 blocks or 300 blocks, for example, in succession to the writing request. The data block counting unit 200 counts the number of blocks of recording data which is thus transmitted.

The calculation unit 201 calculates the number of the data blocks which are to be distributed to each of the record processing units based on the time for transferring the data counted by the data block counting unit 200 from the data transmission/reception unit 100 to each of the record processing units 11 to 14 and time for writing the data in the optical recording medium 20 by each of the record processing units 11 to 14, so as to make end time of the writing time same in all of the channels.

Figure 4:
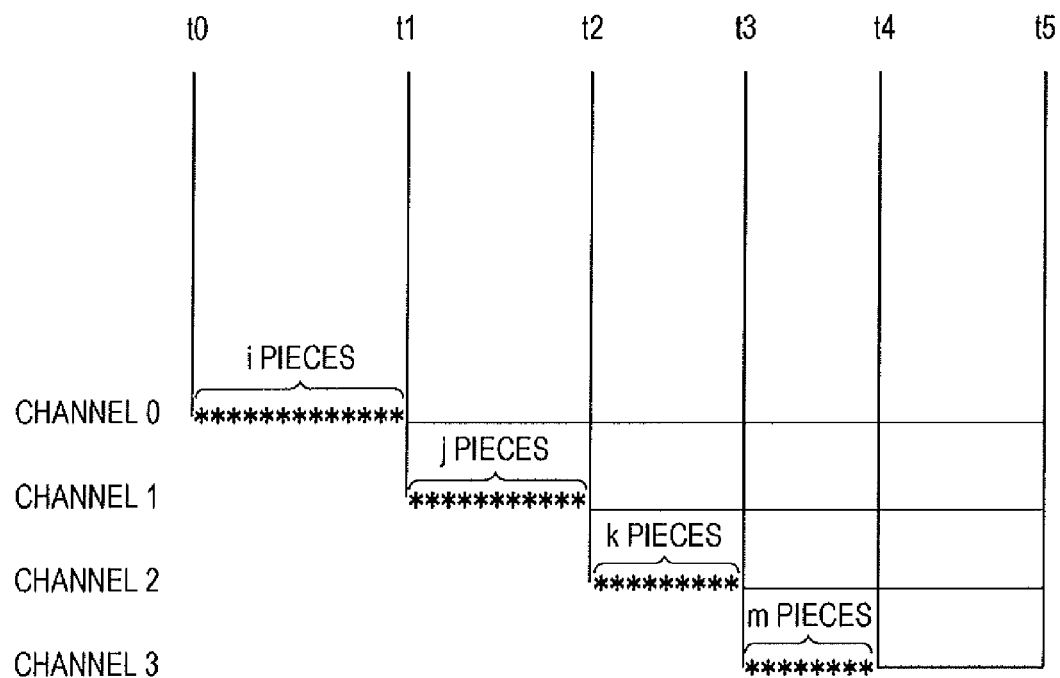
FIG. 4 is a timing diagram of data block transfer and data block recording.

Here, FIG. 4 is a timing diagram of transfer of distributed data blocks and recording of the data blocks in a case of four channels.

Referring to FIG. 4, channels 0 to 3 indicate respective four channels which are composed of respective record processing units 11 to 14 and the optical heads 16 and 17 of the two-channel type.

A symbol of "*" denotes transfer of one block. A solid line "—" following "*" denotes a writing of data to the optical recording medium 20 in each of the channels.

To the channels 0, 1, 2, and 3, i pieces, j pieces, k pieces, and m pieces of blocks are respectively allocated by a predetermined calculation. If these numbers of i, j, k, and m are summed up, a total number n of the data blocks which are to be written in the optical recording medium is obtained.

First, it is assumed that sequence transfer of data blocks from the host computer 2 is started on a time point to. A time point t1 is a time point on which transfer of i pieces of data blocks is ended. These first i pieces of blocks are allocated to the channel 0 and recording to the optical recording medium 20 is performed by the channel 0. The recording of the i pieces of blocks by the channel 0 is ended at a time point t5.

j pieces of blocks transferred in the following period from the time point t1 to a time point t2 are allocated to the channel 1. The j pieces of blocks are recorded in the optical recording medium 20 by the channel 1. The recording of the j pieces of blocks by the channel 1 is ended at the time point t5.

k pieces of blocks transferred in the following period from the time point t2 to a time point t3 are allocated to the channel 2. The k pieces of blocks are recorded in the optical recording medium 20 by the channel 2. The recording of the k pieces of blocks by the channel 2 is ended at the time point t5.

m pieces of blocks transferred in the following period from the time point t3 to a time point t4 are allocated to the channel 3. The m pieces of blocks are recorded in the optical recording medium 20 by the channel 3. The recording of the m pieces of blocks by the channel 3 is ended at the time point t5.

Thus, a predetermined number of data blocks are allocated to each of the channels and the recording operations in all of the channels are ended at the almost same time points.

Accordingly, a plurality of channels can be efficiently used. That is, the recording operation can be completed fastest by appropriately distributing data blocks to the four channels while considering the transfer time.

In order to realize the above operation, the number of data blocks which are to be distributed to each of the channels is obtained in the following way.

The number of all data blocks which are to be recorded in the optical recording medium 20, the number of blocks which are allocated to each of the channels, transfer time per block, and writing time to the optical recording medium 20 per block are defined as below.

Number of all data blocks: n
Number of blocks allocated to channel 0: i
Number of blocks allocated to channel 1: j
Number of blocks allocated to channel 2: k
Number of blocks allocated to channel 3: m
Transfer time per block: x (m seconds)
Writing time to optical recording medium per block: y (m seconds)

$$n = i + j + k + m$$

Sequential writing is started from the channel 0 and data blocks are allocated to the channel 1, the channel 2, and the channel 3 in sequence.

In this case, the start of writing in the channel 1 is x×i (m seconds) behind the start in the channel 0.

Accordingly, the number of data blocks is decreased by x×i/y until the writing in the channel 0 is ended. This is expressed as the following formula.

$$j = i - x \times i / y = (1 - x/y) \times i \qquad \text{Formula 1}$$

In the similar manner, following formulas are obtained.

$$k = (1 - x/y) \times j \qquad \text{Formula 2}$$

$$m = (1 - x/y) \times k \qquad \text{Formula 3}$$

From these formulas, j, k, and m are respectively expressed by the number i of blocks allocated to the channel 0.

$$j = (1 - x/y) \times i \qquad \text{Formula 4}$$

$$m = (1 - x/y)2 \times i \qquad \text{Formula 5}$$

$$m = (1 - x/y)3 \times i \qquad \text{Formula 6}$$

The allocation numbers to all of the channels are expressed by transfer time x, writing time y, and an allocation number i to the channel 0.

In a case where it is assumed that the writing time y is constant in the optical recording device 1, the allocation number to each of the channels can be determined if the transfer time x is obtained.

That is, the number n of all data blocks which are recorded is expressed as n=i+j+k+m. If Formula 4, Formula 5, and Formula 6 in which j, k, and m described above are respectively expressed by i are substituted into n=i+j+k+m, the following formula is obtained.

$$n = i + (1 - x/y) \times i + (1 - x/y)2 \times i + (1 - x/y)3 \times i$$

Accordingly, the number i of blocks allocated to the channel 0 can be obtained from the number n of blocks which is already obtained, the transfer time x, and the writing time y.

Then, after i is obtained, i is substituted into Formula 4, Formula 5, and Formula 6 so as to calculate j, k, and m.

Here, as the transfer time is shorter with respect to the writing time, more equal blocks can be distributed. If the transfer time is 0, all allocation numbers become equal. The transfer time is limited actually, so that the allocation numbers are different from each other.

The end time points of the writing time of all of the channels can be made same as each other by measuring the transfer time and controlling allocation to each of the channels.

The distribution unit 202 distributes transferred data to each of the channels based on the numbers i, j, k, and m of allocated blocks of respective channels which are obtained by the calculation unit 201 as above.

Figure 5:
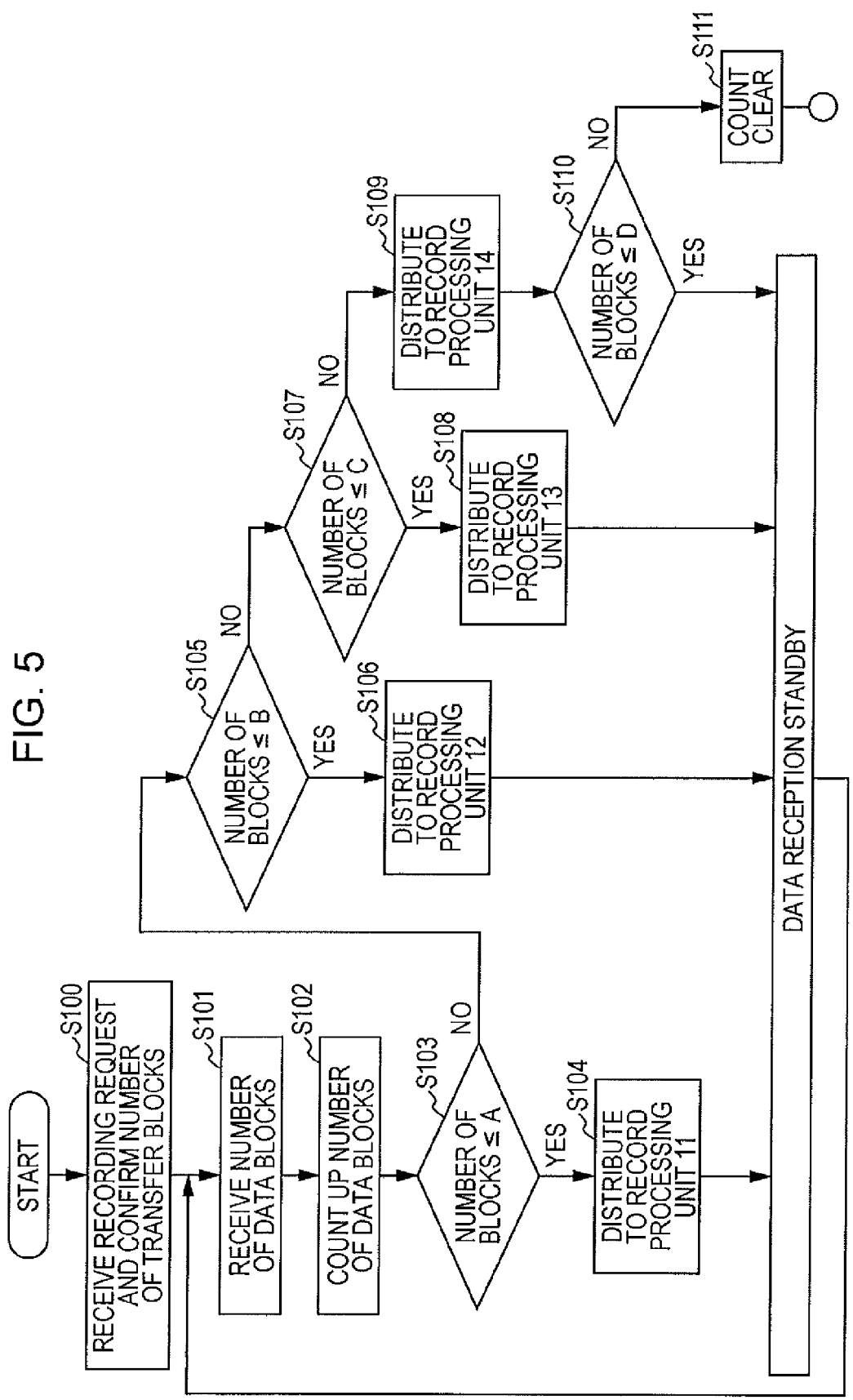
FIG. 5 is a flowchart showing processing operations which are to be performed in the embodiment described first.

FIG. 5 is a flowchart showing processing operations which are described above and are to be performed in the embodiment.

The processing operations in FIG. 5 are performed by the interface control unit 10.

In step S100, the interface control unit 10 receives a recording request from the host computer 2, that is, a request for writing to the optical recording medium, and receives the number of transfer blocks, that is, the number of blocks of data which is written in the optical recording medium. At the same time, the interface control unit 10 confirms the number of blocks.

In step S101, the interface control unit 10 receives the data blocks. That is, the interface control unit 10 receives data of one block from the host computer 2 so as to buffer the data in the storage unit 101.

In step S102, the interface control unit 10 counts the number of data blocks. That is, the data block counting unit 200 counts up an internal counter every time data of one block is buffered in the storage unit 101.

In step S103, the interface control unit 10 performs processing for determining whether a count value which is counted in step S102 (that is, the number of blocks which is transferred) becomes a predetermined value A. Here, the predetermined value A is the number i, which is calculated above, of blocks allocated to the channel 0.

In the beginning, the number of blocks≦A is satisfied, the process goes to step S104.

In step S104, the interface control unit 10 distributes the received data blocks to the channel 0 (the record processing unit 11). That is, the interface control unit 10 transfers the data blocks from the distribution unit 202 to the record processing unit 11 so as to allow the record processing unit 11 to perform a recording operation.

After that, the interface control unit 10 returns the process to step S101 every time the interface control unit receives data of one block (buffering) and repeats operations of steps S101, S102, S103, and S104.

When the interface control unit 10 determines that the number of blocks which is counted in step S102 exceeds the value A at a certain time point in step S103, the process goes to step S105.

That is, referring to FIG. 4, the process goes to the processing of step S104 in the period from the time point t0 to the time point t1, but the count value of the number of blocks exceeds the value A after the time point t1, so that the process goes to step S105.

In step S105, the interface control unit 10 performs processing for determining whether the number of blocks which is counted in step S102 is equal to or less than a value B. Here, the value B is expressed as B=i+j (i and j are the values calculated above).

In the beginning after the time point t1 of FIG. 4, the number of blocks≦B is satisfied, so that the process goes to step S106.

In step S106, the interface control unit 10 distributes the received data blocks to the channel 1 (the record processing unit 12). That is, the interface control unit 10 transfers the data blocks from the distribution unit 202 to the record processing unit 12 so as to allow the record processing unit 12 to perform a recording operation.

After that, during the period in which the counted number of blocks≦B is satisfied, the interface control unit 10 repeats the operations of S101, S102, S105, and S106.

When the interface control unit 10 determines that the number of blocks which is counted in step S102 exceeds the value B at a certain time point in step S105, the process goes to step S107.

Referring to FIG. 4, the process goes to the processing of step S106 in the period from the time point t1 to the time point t2, but the count value of the number of blocks exceeds the value B after the time point t2, so that the process goes to step S107.

In step S107, the interface control unit 10 performs processing for determining whether the number of blocks which is counted in step S102 becomes a value C. Here, the value C is expressed as i+j+k (i, j, and k are the values calculated above).

In the beginning after the time point t2 of FIG. 4, the number of blocks≦C is satisfied, so that the process goes to step S108.

In step S108, the interface control unit 10 distributes the received data blocks to the channel 2 (the record processing unit 13). That is, the interface control unit 10 transfers the data blocks from the distribution unit 202 to the record processing unit 13 so as to allow the record processing unit 13 to perform a recording operation.

After that, during the period in which the counted number of blocks≦C is satisfied, the interface control unit 10 repeats the operations of S101, S102, S105, S107, and S108.

When the interface control unit 10 determines that the number of blocks which is counted in step S102 exceeds the value C at a certain time point in step S107, the process goes to step S109.

Referring to FIG. 4, the process goes to the processing of step S108 in the period from the time point t2 to the time point t3, but the count value of the number of blocks exceeds the value C after the time point t3, so that the process goes to step S109.

In step S109, the interface control unit 10 distributes the received data blocks to the channel 3 (the record processing unit 14). That is, the interface control unit 10 transfers the data blocks from the distribution unit 202 to the record processing unit 14 so as to allow the record processing unit 14 to perform a recording operation.

In step S110, the interface control unit 10 performs processing for determining whether the number of blocks which is counted in step S102 becomes a value D. Here, the value D is expressed as i+j+k+m (i, j, k, and m are the values calculated above, that is, D=n).

During the period in which the counted number of blocks≦D is satisfied, the interface control unit 10 repeats the operations of S101, S102, S105, S107, and S109.

When the number of blocks which is counted in step S102 exceeds the value D at a certain time point (the time point t4 in FIG. 4) in step S110, the process goes to step S111 and the number of blocks which is counted in step S102 is cleared. Accordingly, the operation of distributing data of the total block number n to each of the channels is ended.

Thus, the data distributed to each of the channels undergoes record processing in each of the channels. As described in FIG. 4, the recording operations in all of the channels are subsequently completed at the time point t5.

Here, though the optical recording device having four channels as a recording system is described in the embodiment, allocation can be realized in the same method in any number of channels. To make assurance double sure, a case of two channels is described.

In a similar fashion, in the case of two channels as well, the number of all data blocks which are to be written in the optical recording medium, the number of blocks which are allocated to each of the channels, transfer time per block, and writing time to the optical recording medium per block are defined as below.

Number of all data blocks: n
Number of blocks allocated to channel 0: i
Number of blocks allocated to channel 1: j
Transfer time per block: x (m seconds)
Writing time to the optical recording medium per block: y (m seconds)

$$n=i+j$$

Writing is started from the channel 0 and then data blocks are allocated to the channel 1. In this case, the start of writing in the channel 1 is $x \times i$ (m seconds) behind the start in the channel 0. Accordingly, the number of data blocks is decreased by $x \times i/y$ until the writing in the channel is ended. This is expressed as $j=i-x \times i/y=(1-x/y) \times i$. Accordingly, the allocation numbers to all of the channels are expressed by the transfer time, the writing time, and the allocation number to the channel 0.

According to the embodiment described above, a plurality of channels can be efficiently used, usability of each of the channels can be optimized, and high-speed recording can be realized.

Another Embodiment

Subsequently, another embodiment is described.

In the embodiment described first, the number of blocks which are allocated to each channel is obtained by calculation of the calculation unit 201. The calculation is performed every time data is transmitted from the host computer and the number of data blocks which is obtained by the calculation is allocated to each of the channels.

In the other embodiment, the numbers of blocks which are to be distributed are preliminarily provided as a table, that is, no calculation is performed, and data is distributed to each channel in a block unit based on numerical values of the table so as to record the data to the optical recording medium 20.

Figure 3:
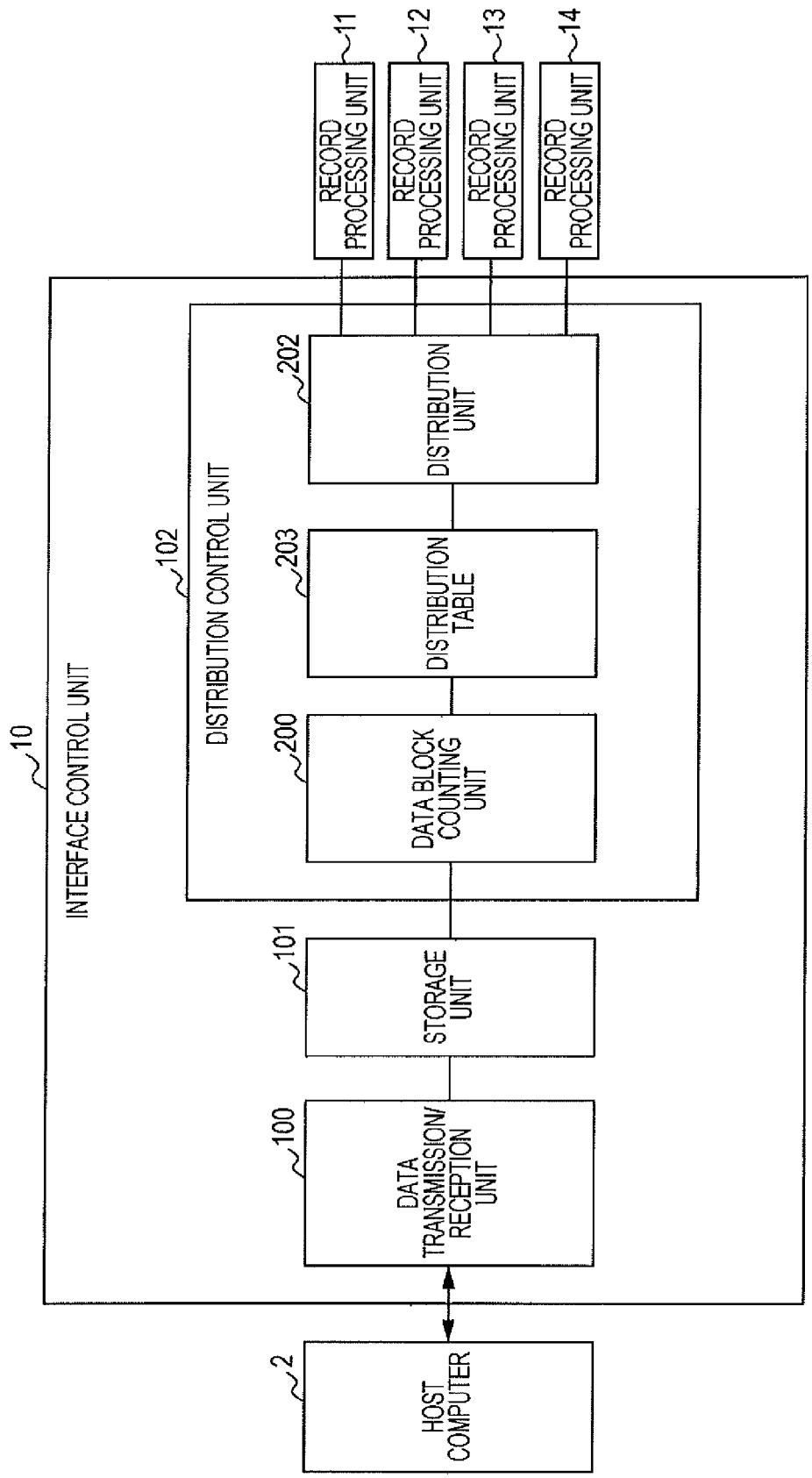
FIG. 3 illustrates another embodiment of the present technology.

FIG. 3 is a block diagram of the other embodiment. In the following description, elements same as those already described in the above embodiment have the same reference numerals and the description of the elements is skipped.

A distribution table 203 includes the numbers of blocks of the data which are distributed to each of the channels as a form of a table (memory table). The distribution table 203 may be a ROM or a nonvolatile memory. For example, the distribution table 203 may be a flush memory or the like.

In a case where the number n of blocks of data which is transmitted from the host computer is fixed in advance, if the number of blocks which are to be distributed to each of the channels is obtained by the calculation shown in the embodiment described first while corresponding to the fixed number and the obtained number of blocks is stored in a table, the same function can be realized.

In a case where there are several kinds of numbers n of blocks of data which is transmitted from the host computer, it is sufficient to provide tables that correspond to the several kinds and store the numbers of blocks which are to be distributed to respective channels. That is, when the interface control unit 10 acquires the transmitted total block number n in a writing request, the interface control unit 10 refers to the distribution table 203 while corresponding to the total block number n so as to determine the number of blocks which are to be distributed to each of the channels.

According to the other embodiment, calculation time for calculating the number of blocks can be omitted, enabling higher-speed writing to the optical recording medium.

It should be understood by those skilled in the art that various modifications, combinations, sub-combinations and alterations may occur depending on design requirements and other factors insofar as they are within the scope of the appended claims or the equivalents thereof.

What is claimed is:

1. A recording device, comprising:
   a plurality of channels configured to record data to an optical recording medium;
   a reception unit configured to receive data transmitted from an external device;
   a storage unit configured to temporarily store the data that is received by the reception unit; and
   a distribution control unit configured to read the data that is stored in the storage unit and distribute the data by a block unit to the plurality of channels based on transfer time of the data and recording time to the optical recording medium so that record processing of the plurality of channels are simultaneously ended.

2. The recording device according to claim 1, wherein the distribution control unit includes
   a data block counting unit configured to count the number of blocks of the data,
   a calculation unit configured to calculate the number of blocks that are to be distributed to each of the plurality of channels so that among the number of blocks of the data, the number of blocks being counted by the counting unit, a predetermined number of blocks that are transmitted to a first channel of the plurality of channels are transferred, then a predetermined number of blocks that are transmitted to a next channel are transferred, and after this transfer, transfer is performed to another next channel so as to transfer a predetermined number of blocks to all of the channels, a sum of the numbers of blocks that are transferred to each of the channels is same as the number of blocks, the number of blocks being counted by the counting unit, and end time of the transfer time and the recording time of the predetermined number of the blocks that are transmitted to the first channel of the plurality of channels is same as end time of the transfer time and the recording time with respect to each of the channels other than the first channel, and
   a distribution unit configured to distribute a predetermined number of blocks to each of the plurality of channels among the blocks of which the number is counted by the counting unit, based on the calculation unit.

3. The recording device according to claim 2, wherein the calculation unit calculates the number of blocks that are to be transmitted to an a-th channel that is a second or later channel by $(1-x/y)(a-1) \times i$ by using transfer time x to the channel per block, recording time y per block, and the number i of blocks that are to be transferred to the first channel of the plurality of channels, with respect to the number n of blocks of the data, the number n of blocks being counted by the counting unit, and thus calculates the number of blocks that are to be transmitted to each of the plurality of channels so that the number of all blocks becomes n.

4. The recording device according to claim 2, wherein
the distribution control unit includes a distribution table that shows the number, the number being calculated in the calculation unit, of blocks that are to be distributed to the plurality of channels as a table in a manner that the number of blocks corresponds to a value of the number n of the blocks, and distributes a predetermined number of blocks to each of the plurality of channels by using the distribution table.

5. A recording method for recording data to an optical recording medium in a recording device having a plurality of channels, comprising:
counting the number of blocks of the data; and
distributing and recording to each of the plurality of channels so that among the counted number of blocks of data, a predetermined number of blocks that are transmitted to a first channel of the plurality of channels is transferred, then a predetermined number of blocks that are transmitted to a next channel are transferred, and after this transfer, transfer is performed to another next channel so as to transfer a predetermined number of blocks to all of the channels, a sum of the numbers of blocks that are transferred to each of the channels is same as the counted number of blocks, and end time of transfer time and recording time of the predetermined number of the blocks that are transmitted to the first channel of the plurality of channels is same as end time of the transfer time and the recording time with respect to each of the channels other than the first channel.

6. A recording method for recording data to an optical recording medium in a recording device having a plurality of channels, comprising:
counting the number of blocks of the data; and
calculating the number of blocks that are to be transferred to an a-th channel that is a second or later channel by $(1-x/y)(a-1) \times i$ by using transfer time x to the channel per block, recording time y per block, and the number i of blocks that are to be transmitted to a first channel of the plurality of channels, with respect to the counted number n of blocks of the data and thus calculating the number of blocks that are to be transmitted to each of the plurality of channels so that the number of all blocks becomes n, so as to distribute and record the number of blocks to each of the channels.

* * * * *